UNITED STATES PATENT OFFICE.

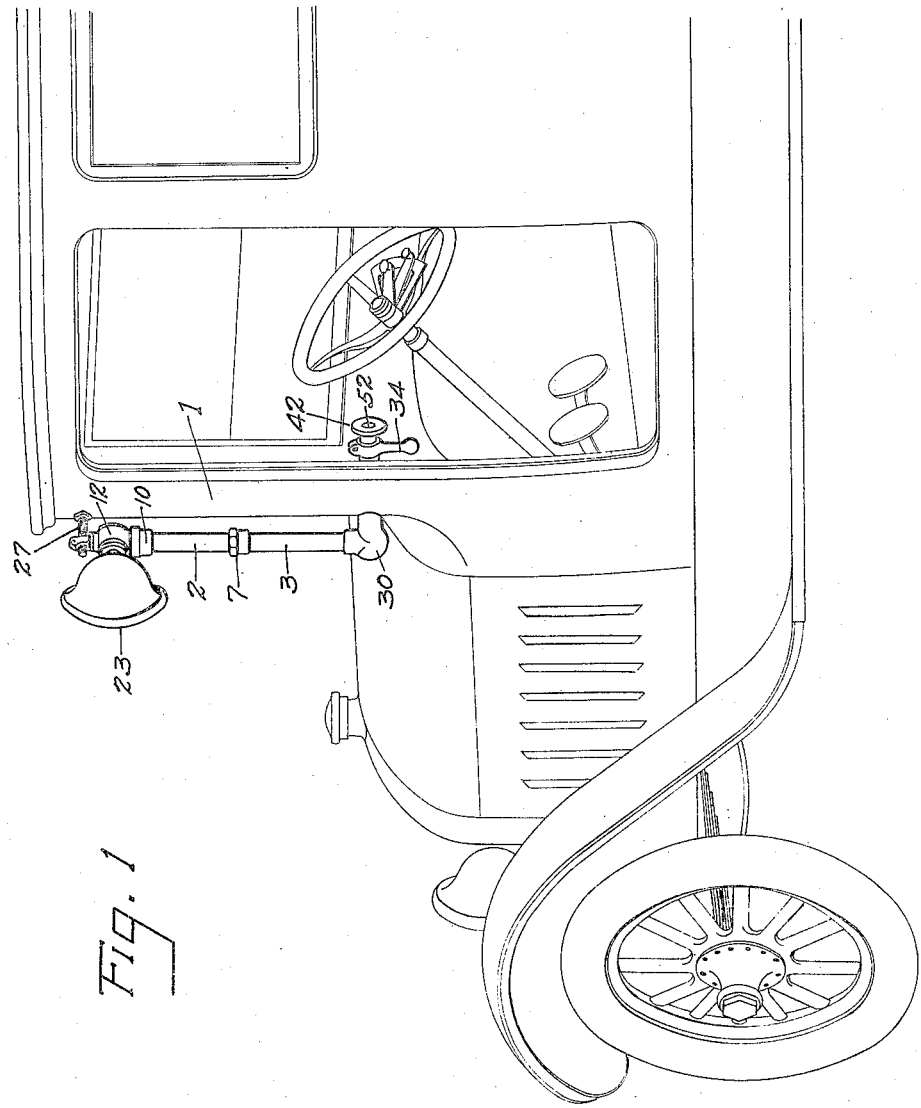

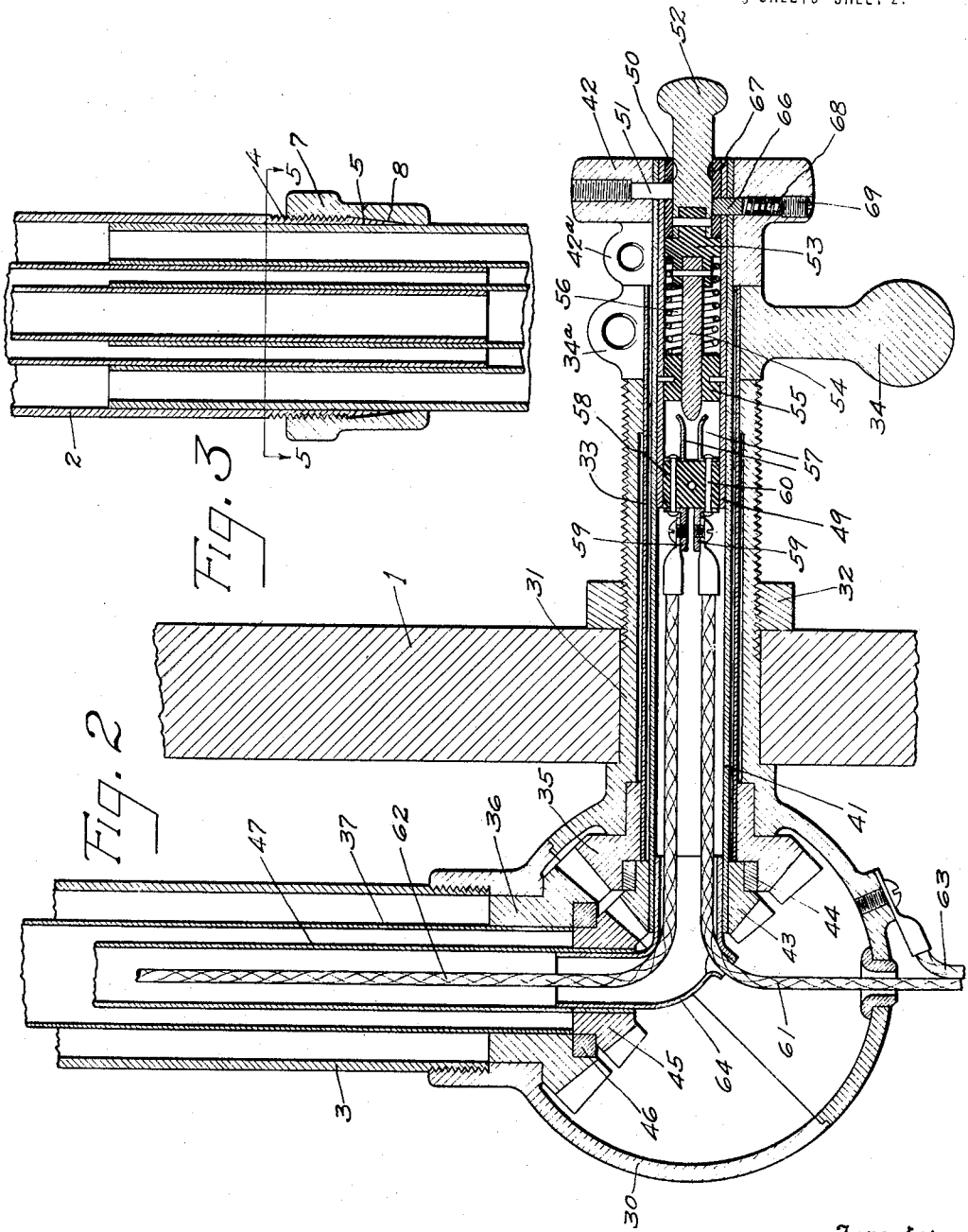

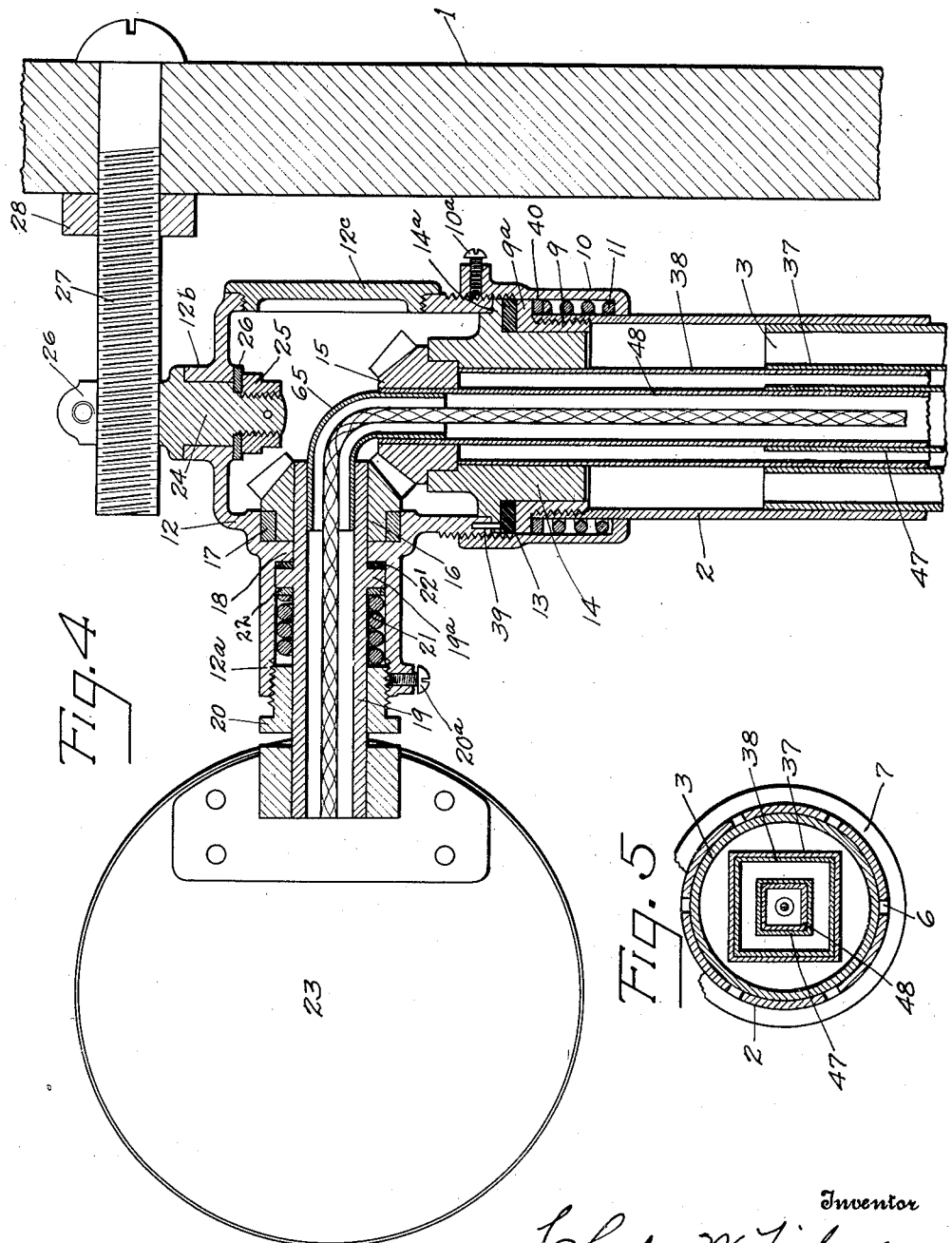

CHARLES W. FISHER, OF SPRINGFIELD, OHIO, ASSIGNOR TO THE O. S. KELLY COMPANY, OF SPRINGFIELD, OHIO, A CORPORATION OF OHIO.

SUPPORT FOR SPOTLIGHTS.

1,413,977.  Specification of Letters Patent.  Patented Apr. 25, 1922.

Application filed March 3, 1919. Serial No. 280,301.

*To all whom it may concern:*

Be it known that I, CHARLES W. FISHER, a citizen of the United States, residing at Springfield, in the county of Clark and State of Ohio, have invented certain new and useful Improvements in Supports for Spotlights, of which the following is a specification.

My invention relates to supporting brackets for electric lights, it more particularly relating to a bracket for supporting a spot light from the closed body of an automobile.

The object of the invention is to provide a bracket of the character referred to which may be readily attached to a closed body of an automobile so constructed that the light is not only supported at any desired height but may also be turned to any desired angle from the driver's seat within the car; provision being also made for controlling the electric current for the light from the same point.

A further object of the invention is to provide a bracket which will be attractive in appearance, capable of being installed without marring the body, simple in construction and effective in operation.

In the accompanying drawings:—

Fig. 1 is a view of a portion of the body of an automobile showing my improved bracket applied thereto.

Fig. 2 is a vertical section of the lower portion of the bracket, showing a small section of the body.

Fig. 3 is a vertical section of the joint between the upper and lower bracket sections.

Fig. 4 is a vertical section of the upper portion of the bracket, together with a small section of the body and also showing the rear of the spot light.

Fig. 5 is a transverse section on the line 5—5 of Fig. 3.

The part of the body to which the bracket is applied is what is known as the front panel, indicated by 1. The vertically extending portion of the bracket has an outer casing, formed in two parts 2 and 3, of tubular form, telescoped and joined together in the manner shown in Figs. 3 and 5. The lower end of the upper portion 2, within which fits the upper end of the lower portion 3, is screwthreaded as at 4, and below the screwthreads is tapered, as shown at 5 in Fig. 3 and split vertically in several places as indicated by 6 in Fig. 5. Threaded on the screwthreaded portion of the part 2 is a nut 7 having a tapered interior as indicated at 8 in Fig. 3, as a result of which, when the nut is turned to position the parts will be firmly clamped together. This form of connection allows for vertical adjustment to accommodate different heights of bodies and to adjust the light to the desired position.

Threaded into the upper end of the part 2 is a bushing 9 having a laterally projecting flange 9ª and surrounding the same is a nut 10, the lower end of which is inturned against the tube so as to form with the flange 9ª a chamber for a spring 11. The nut is threaded on the lower end of an open bottom housing 12, which has a laterally projecting side extension 12ª, a hub 12ᵇ at its upper end and a removable cap 12ᶜ.

Laid on the flange 9ª of the bushing is a fibre washer 13 and rotatably mounted on this washer is the flange 14ª of a collar 14, the lower portion of which is journaled in the bushing 9. In the upper end of the collar is journaled a beveled pinion 15, which meshes with a beveled pinion 16, the hub of which is journaled in a hardened ring 17, supported in the housing 12 at the inner end of the extension 12ª, with the end of the hub and ring abutting an inturned flange 18 in the extension 12ª. Secured to the pinion 16 is a hollow shaft 19, having a collar 19ª fitted to the bore of the extension 12ª; its outer end being journaled in a hollow nut 20 threaded in the interior of the extension. A spring 21 is interposed between the nut and the collar 19ª, the nut furnishing means for adjusting its tension. A hardened washer 22 is preferably placed between the spring and collar and between the collar and flange 18 there is inserted a fiber washer 22'.

In assembling the parts thus far described, the shaft is inserted in the housing extension from the outer end thereof until its collar rests against the fibre washer 22', the steel washer, spring and nut being afterwards inserted and the proper adjustment of the spring made, after which the nut may be locked to position by the set screw 20ª, the tension of the spring serving to hold the light in its adjusted position. To the outer end of the shaft may then be attached the spot light 23. The pinion 16 is inserted through the opening covered by the cap 12ᶜ, and connected to the shaft by a spline. The pinion 15 is placed in position before the housing is connected to the tube.

In connecting the housing and tube, the nut 10 is screwed up to put the desired degree of tension upon the spring 11 to draw the housing, fibre washer and flange 9ª together sufficiently to give the proper degree of friction, after which the nut may be locked in position by the set-screw 10ª. Means are provided for rotating the shaft 19 through the medium of the beveled pinions for the purpose of tilting the light 23 up or down in a manner which will be hereinafter described.

The housing is swivelly supported from the upper end of the panel 1, the hub 12ᵇ thereof being journaled upon a shouldered stud 24, being secured thereon by the nut 25 threaded on the lower end of the stud, a steel washer 26 being preferably inserted between the nut and inner end of the hub. The upper end of the stud has a clamp 26 by which it may be secured to a bolt 27 which is inserted through an opening made in the upper end of the panel 1, being locked in position by the nut 28. The housing is swung about the stud 24 by means which will hereinafter be described for the purpose of turning the light 23 in a lateral direction.

The lower end of the lower tube section 3 is threaded into a housing 30, formed in two sections secured together in any suitable manner. The housing 30 has a hollow extension 31 which is projected through an opening made at a suitable point in the lower portion of the panel 1, the extension being screwthreaded to receive a nut 32 by which it may be clamped to position, a shoulder being formed on the extension to bear against the outer side of the panel. The extension will preferably be extended through the panel at an angle so as to project the operating parts associated therewith to within convenient reach of the driver, as shown in Fig. 1.

Journaled in the extension 31 is a tube 33, the inner end of which projects beyond the extension and has connected therewith a handle 34, the handle having a split clamp portion 34ª for the purpose. The other end of the tube has connected thereto a beveled pinion 35, journaled in the wall of the housing, which meshes with a beveled pinion 36, likewise journaled in the wall of the housing with its axis vertically arranged. The hub of the pinion 36 has a square opening in which is fitted a square tube 37 which extends through the casing section 3 and slidably telescopes with another square tube 38 in the upper casing section 2, the tube section 38 being fitted to a square opening in the collar 14. By manipulating the handle 34 it will thus be seen that the hub can be rotated about the fibre washer 13, and, by reason of a pin 39 which connects it with the housing 12, the housing will be rotated to swing the light laterally in either direction. The spring 11 will rotate with the nut about the upper end of the casing 2 and a steel wearing washer 40 is inserted between the spring and flange 9ª; the tension of the spring serving to place enough friction between the fibre washer 13 and flange 14ª of the collar to hold the parts in their adjusted positions.

Extending through the tube 33 in the housing extension 31 is another tube 41, which projects beyond the inner end of the tube 33 and has connected therewith an operating knob 42, the hub of the knob having a split clamp 42ª for this purpose. The other end of the tube is connected with a beveled pinion 43, journaled in a steel ring 44 in the hub of the pinion 35 and meshing with a beveled pinion 45 journaled in a steel ring 46 in the hub of the pinion 36. Fitted in a square opening in the hub of the pinion 45 is a square tube 47 which extends up through the tube 37 and slidably telescopes with another square tube section 48 in the upper casing 2, which has its upper end fitted in the beveled pinion 15. Thus, when the knob 42 is turned, the shaft 19 will be rotated and the light tilted up or down, the friction between the fibre washer 22′ and the collar 19ª of the shaft, due to the tension of the spring 21, serving to hold the parts in their adjusted positions.

For the purpose of turning the light on or off from the driver's seat, there is located in the extension 31 a switch mechanism for controlling the electric circuit to the light. A tube 49 snugly fits the tube 41 with their inner ends flush. Located at the inner end of the tube 49 is a bushing 50 of insulating material, a pin 51 connecting the bushing, the two tubes 41 and 49 and the knob 42 together, the upper end of the pin having a head which is threaded into the knob so that the pin may be readily inserted or removed. Slidably mounted in the bushing and tube is the movable member of the switch consisting of a push button 52, block of insulating material 53 to which the button is pinned and fitting the bore of the tube, contact 54 also pinned to the block 53 and slidably mounted in a guide 55 of insulating material, which guide is pinned to the tube, and spring 56 interposed between the stationary guide and the block 53.

The stationary switch member consists of the spring contacts 57 secured to a block 58 of insulating material located in the outer end of the tube and electrically connected to metallic plates 59 on the opposite side of the block by conductors 60 passing through the block, to which plates the terminals of conducting cables 61 and 62 are attached. The cable 61 leads to the battery or other source of electricity while the cable 62 extends through the inner tubes 47 and 48 and shaft 19 to one terminal of the light, the return circuit to the battery being through the metallic bracket parts, with which the other light terminal is grounded and cable 63 connected to the lower side of the housing and grounded to the car. At the points where the cable pass through the pinions, cable protecting bent tubes 64 and 65 are preferably provided, the tubes being inserted with a tight fit in the respective tubes 41, 47 and 48 and in the shaft 19.

When the button 52 is pushed in to establish the circuit it is held in that position by a catch in the nature of a pin 66 with a rounded end which snaps into a groove 67 in the shank of the button under stress of a spring 68; the pin and spring being located in openings formed in the knob 42, tubes 41 and 49, and bushing 50, the outer end of the opening in the knob being closed by a screwthreaded plug 69. To break the circuit the operator pulls out the button to release the catch, which is then thrown and held in its inoperative position by the spring 56.

While the device has been described as attached to the front panel of the body of a closed car, it may be if desired secured to the windshield of an automobile having side curtains, by brackets which may be clamped to the housing extension 31 and the bolt 27 and also clamped to the side of the wind shield.

Having thus described my invention, I claim:—

1. In a device of the character described, a hollow support consisting of a stationary horizontal portion projecting through the closed body of a motor vehicle and supported thereby, a vertically extending stationary portion projecting upwardly on the outside of said body, and a portion swivelly connected to the upper end of said vertical portion, a stationary support on the vehicle body to which said swivelled portion is also swivelly connected to permit the same to oscillate on the vertical axis of said support, an electric light carried by said swivelled portion, and devices carried by and within said support and operable from within the vehicle body to adjust the position of said light.

2. In a device of the character described, a hollow support consisting of a stationary horizontal portion projecting through and supported by the closed body of a motor vehicle, a vertically extending stationary portion on the outside of said body and projecting upwardly, and a portion swivelly connected to the upper end of said vertical portion, a stationary support on the vehicle body to which said swivelled portion is likewise swivelly connected, the swivelled connections being such as to permit said swivelled portion to oscillate on the vertical axis of said support, an electric light and its casing swivelly connected to the swivelled portion of said support to permit said casing to oscillate on an axis at right angles to the axis of oscillation of the swivelled portion of said support, and devices carried by and within said support and operable from within the vehicle body to adjust the position of said light casing by swinging it upon its axis or by swinging the swivelled portion of said support.

3. In a device of the character described, the combination, with a vehicle body, of a hollow support secured to the front thereof and having its lower end extending within said body to within convenient reach of the driver, the upper end of said support being swiveled on a vertical axis, an electric lamp carried by said swiveled portion, devices within said support operable from within the body to rotate said swiveled portion thereof to swing said lamp laterally, frictional means for holding said swiveled portion of said support in its adjusted position, and devices within said support also operable from within the body to tilt said lamp up or down, and frictional means for holding said devices and the lamp in such adjusted position.

4. In a device of the character described, the combination, with an automobile body, of a hollow support, together with means for securing the same to said body, the lower end of said support being extended within said body to within convenient reach of the driver, the upper end of said support being swiveled upon a vertical axis, a shaft carried by said swiveled portion of said support, an electric light connected with said shaft, devices within said support and operable from the portion thereof within the body for rotating said swiveled portion thereof to swing said light laterally, and devices in said support including beveled pinions and connections, operable from that portion of said support within said body, for oscillating said shaft to tilt said light up or down.

5. In a device of the character described, the combination, with a closed vehicle body, of a hollow support, together with means for securing the same to the front panel of said body, the lower end of said support being extended within said body to within convenient reach of the driver, the upper end of said support being swiveled upon a vertical axis, a shaft in said swiveled portion, an electric light carried by said shaft, devices within said support and operable from that portion thereof within the body for rotating said swiveled portion thereof to swing said light laterally, frictional means for holding said swiveled portion in its adjusted position, and devices in said support including beveled pinions and connections, operable from that portion of said support within the body, for oscillating said shaft to tilt said light up or down, and frictional means for holding said shaft in its adjusted position.

6. In a device of the character described, a support, together with means for securing the same to a closed automobile body, said support including a stationary portion which projects through one wall of said body and also a vertically-extending portion on the outside of said body, an electric lamp carried at the upper end of said vertical portion of said support, devices carried by said support and operable from within the body to adjust the position of said light, means for adjusting the length of the vertical portion of said support.

7. In a device of the character described, a support, together with means for connecting the same to a closed automobile body, said support comprising vertically-arranged slidable telescopic sections on the outside of said body and a stationary lower portion which extends through one of the walls of said body to a point within the same, an electric lamp carried at the upper end of said vertical portion of said support, devices carried by said support and operable from within the body to adjust the position of said lamp, and means for clamping the sections of the vertical part of said support together.

8. In a device of the character described, a support, means for securing the same to a closed automobile body, said support comprising a vertically-extending portion adjustable as to length and a stationary lower end extending through one of the walls of said body to a point within the same, an electric lamp carried at the upper end of the vertical portion of said support, and devices carried within said support and operable from within the body to adjust the position of said light, those portions of said devices which are located in the vertical portion of said support being adjustable as to length.

9. In a device of the character described, a support, means for adjusting the length of said support, means for securing the same to an automobile body, an electric lamp carried by said support on the outside of said body, and devices carried by said support and operable from within the body to adjust the position of said light, said devices comprising slidable telescopic connections.

10. In a device of the character described, a support, said support comprising slidable telescopic sections, together with means for securing the same to an automobile body, an electric lamp carried by said support on the outside of said body, and devices carried by said support and operable from within the body to adjust the position of said light, said devices comprising slidable telescopic connections corresponding to the slidable telescopic section of said support so as to be adjustable therewith.

11. In a device of the character described, a support, said support comprising vertically arranged slidable telescopic sections, together with a housing at the upper and lower ends thereof, the upper housing being swivelly supported, an electric lamp, carried by said upper housing, gears arranged in said housing, and connections between the gears, the upper housing and the lamp, together with means for operating said gears, said connections being adjustable as to correspond with the adjustability of the telescopic sections of said support.

In testimony whereof, I have hereunto set my hand this 10th day of February, 1919.

CHARLES W. FISHER.

Witness:
CHAS. I. WELCH.